June 7, 1927.
H. I. MARLER
1,631,497
DENTAL X-RAY FILM PACKAGE
Filed Sept. 20, 1923
FIG_1.
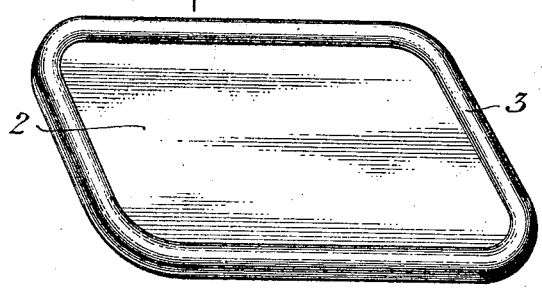
FIG_2.
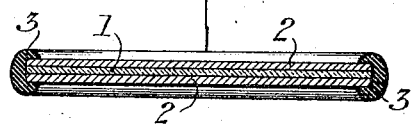
FIG_3.
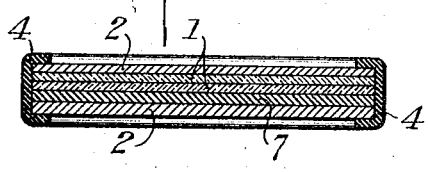
FIG_4.
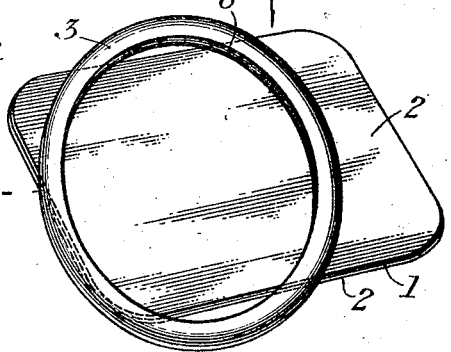
FIG_5.
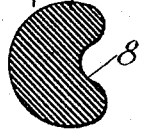
FIG_6.
FIG_7.
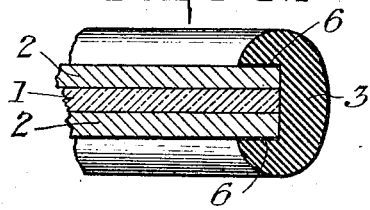
INVENTOR.
Harry I. Marler,
BY R. L. Stinchfield
N. M. Perrins
ATTORNEYS.

Patented June 7, 1927.

1,631,497

UNITED STATES PATENT OFFICE.

HARRY I. MARLER, OF NEW YORK, N. Y., ASSIGNOR TO EASTMAN KODAK COMPANY, OF ROCHESTER, NEW YORK, A CORPORATION OF NEW YORK.

DENTAL X-RAY-FILM PACKAGE.

Application filed September 20, 1923. Serial No. 663,929.

This invention relates to packages of sensitized film prepared for use individually in dental X-ray work.

The objects of this invention are that such a package can be assembled easily and cheaply, that it will be notatably easy to open in the dim light of the dark room, and particularly that it shall be comfortable to the patient.

These objects are attained by the simple expedient of using, as a binding means for holding together the edges of the sheets of material comprising the package, a band of soft elastic rubber.

Other objects and advantages will appear from the following description in which reference is made to the accompanying drawings, in the several figures of which the same reference characters designate the same parts throughout, and in which Fig. 1 is a perspective view of my improved package;

Fig. 2 is a section through the package;

Fig. 3 is a section through a somewhat different package;

Fig. 4 shows in perspective, the rubber edge band, and the collected sheets before assembly;

Figs. 5 and 6 are sections of different forms of band used for the beading; and

Fig. 7 is a fragmentary section of a modified package.

The package, in its simplest embodiment, comprises the usual sensitized sheet 1, preferably film, upon each side of which is an opaque protective sheet 2. Preferably, but not necessarily, these sheets 2 are waterproof and of cardboard, which, while easily bendable without cracking, render the package rather stiff. A rubber beading 3 entirely surrounds the package and embraces and holds together the edge. This may be molded rubber but preferably is a heavy rubber band having a periphery, when unstretched, less than the package, as shown in Fig. 4. The band is applied merely by stretching and snapping it around the edges of the collected sheets. The tension at the edges of the band draws these tightly down over the margins of the protective sheets and holds them securely together during the use to which they are ordinarily subject. If a heavy band of red rubber is used I have found the joint light tight under ordinary working conditions. The efficient life of the rubber band is greater than the period for which the sensitive material is usually guaranteed. The heavy band of rubber, even when under tension, gives the package a soft, yielding edge that is more comfortable to the patient than any other package with which I am familiar. This band may, when unstretched, have a concave inner surface 8 as is shown in Figs. 4 and 5, or may be a heavy flat band 4 as shown in section in Fig. 6. In Fig. 3, there are shown as incorporated in the package two sheets of film 1, and a sheet of metal foil 7, besides the protective sheets 2, the beading in this figure being formed from a flat band 4. If desired the band may be held in place by a slow-drying cement applied to the edges of its inner surface as indicated at 6 in Fig. 7. Such a cement comprising a composition of rubber and coal tar pitch with a suitable softener such as benzol, gasoline or chloroform is well known. It furnishes an added security in holding the package together under unusually rough treatment or if flexed more than is customary.

When the package is to be opened in the dark room it is obvious that all that has to be done is to stretch the beading enough to snap it off one end of the package. If a cement is used, the beading can still be easily stripped off without mutilation of the sheets.

The beading is soft and pliable and does not take a set if bent. The stiffness of the package and the tension of the stretched rubber should be so related that, while the band is held firmly in place and holds the sheets securely, the latter will not be buckled or distorted by the edge strain.

The above described embodiments are given by way of illustration and I contemplate as within the scope of my invention all such modifications and equivalents as fall within the terms of the appended claims.

Having thus described my invention, what I claim as new and desire to secure by Letters Patent is:

1. A dental X-ray package comprising a sheet of sensitive material, protective sheets on opposite sides thereof and an edge beading comprising a soft rubber band, said band being under tension and embracing and contacting the edges of the said sheets.

2. A dental X-ray film package comprising a sheet of sensitive film, a sheet of protective flexible material on each side thereof and an edge beading of soft elastic rubber, said beading being formed from a single rubber band and serving to hold the sheets together and also serving as a cushion edge for the package, the package so formed being capable of being bent.

Signed at New York, New York, this 10th day of Sept., 1923.

HARRY I. MARLER.